June 23, 1931.   B. LASSMAN   1,811,138
APPARATUS FOR PRESSURE TESTING
Filed Oct. 3, 1927   4 Sheets-Sheet 1
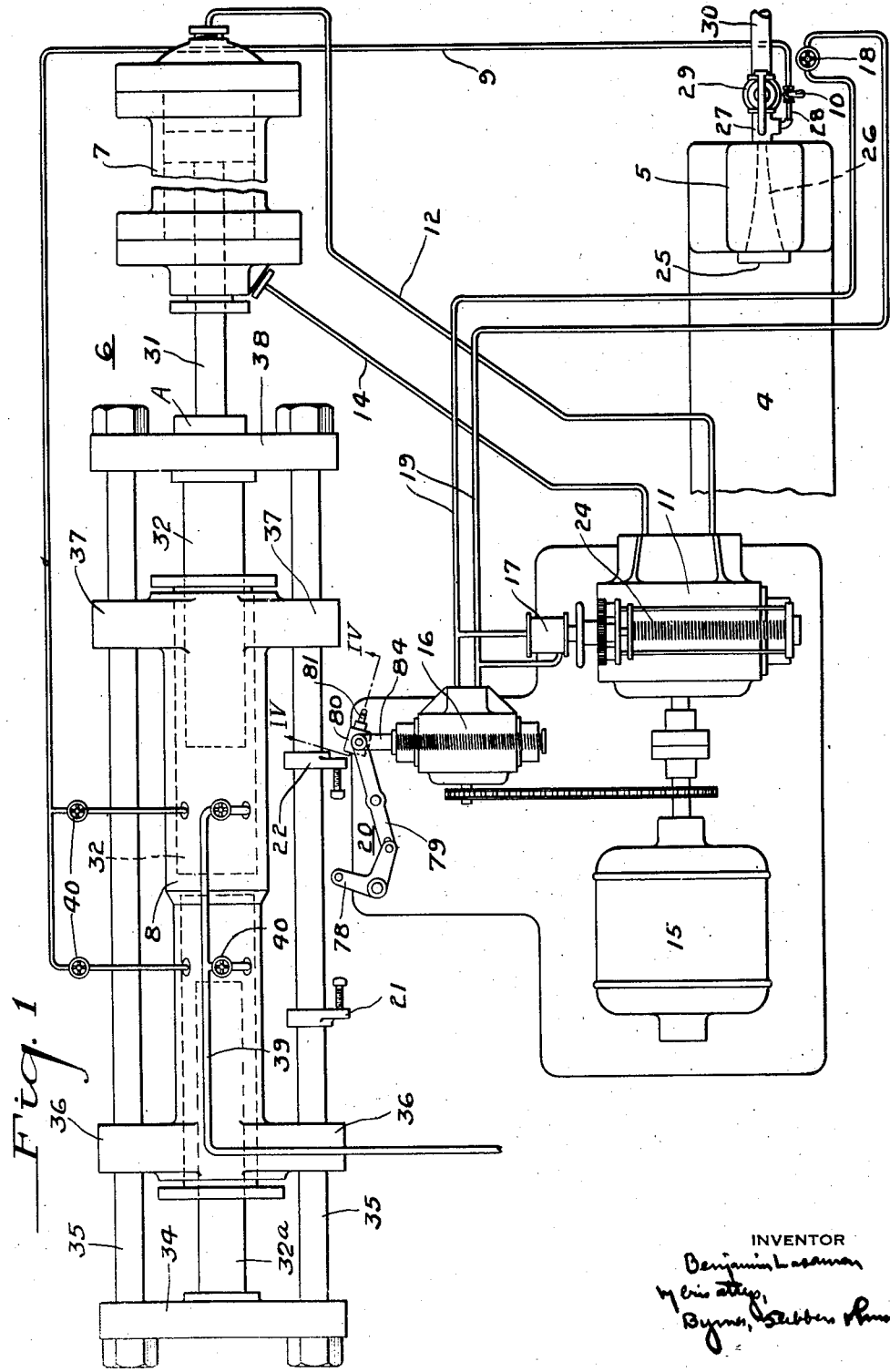
INVENTOR June 23, 1931.  B. LASSMAN  1,811,138
APPARATUS FOR PRESSURE TESTING
Filed Oct. 3, 1927  4 Sheets-Sheet 2
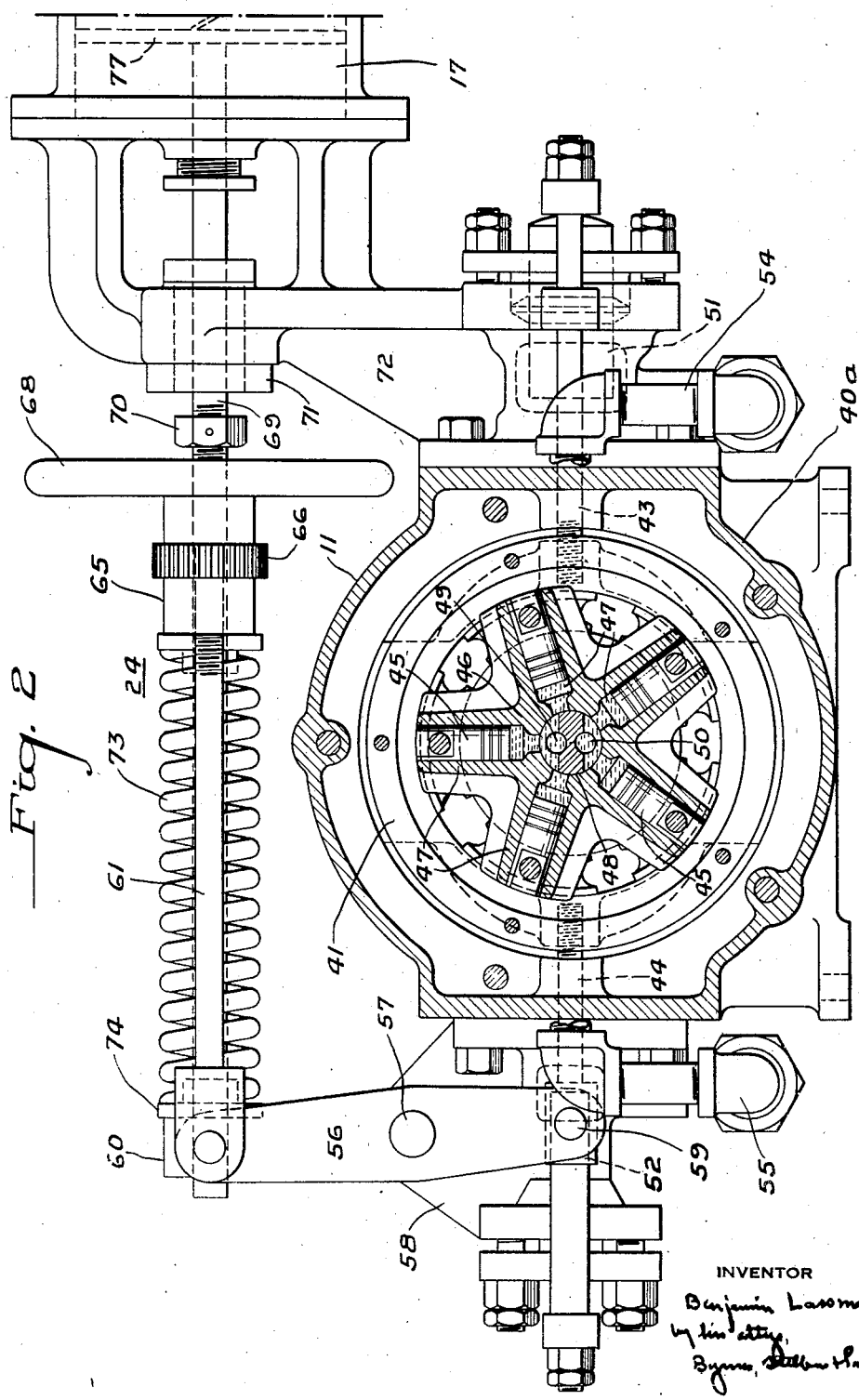
INVENTOR

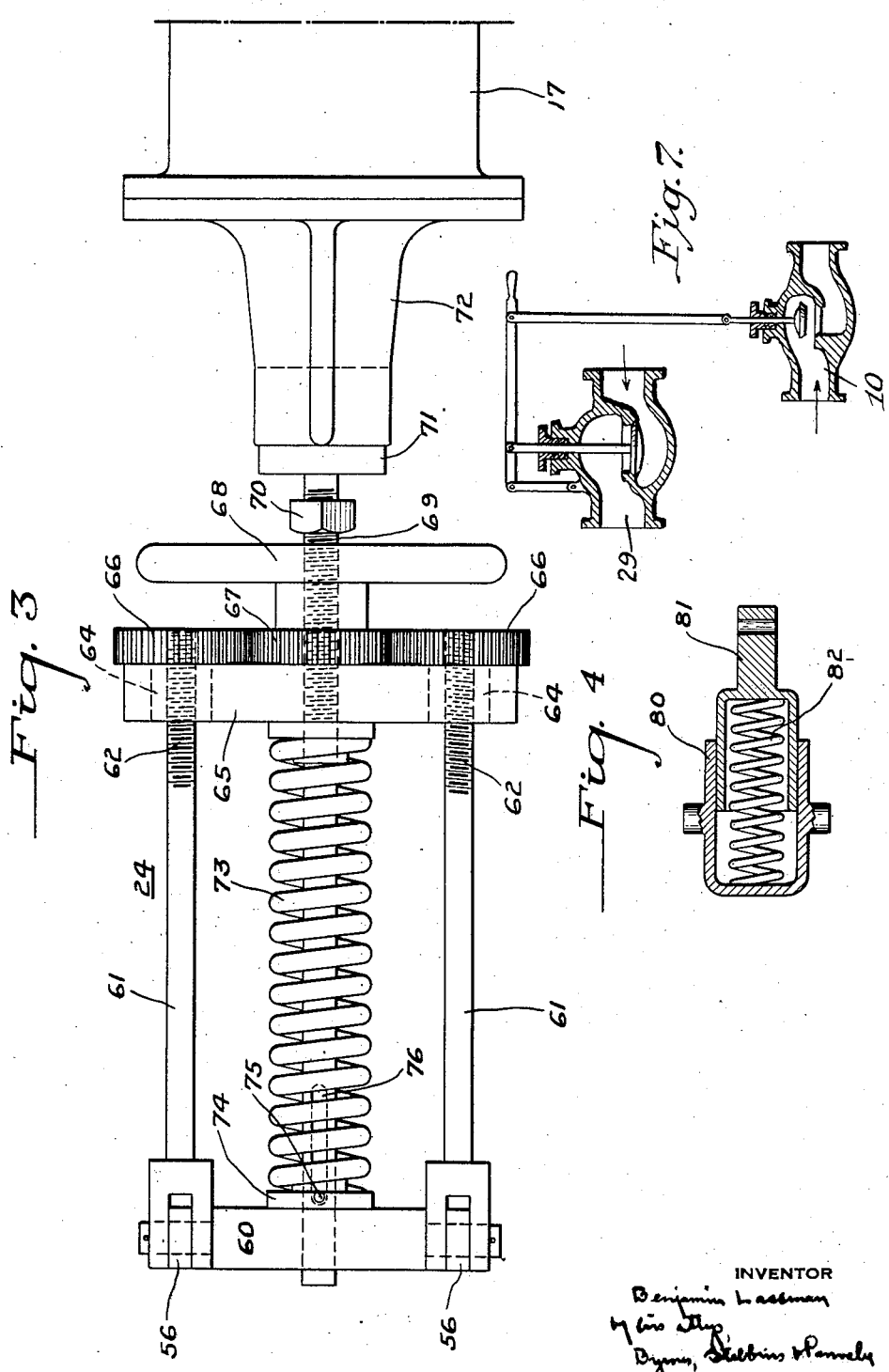

June 23, 1931. B. LASSMAN 1,811,138
APPARATUS FOR PRESSURE TESTING
Filed Oct. 3, 1927 4 Sheets-Sheet 4
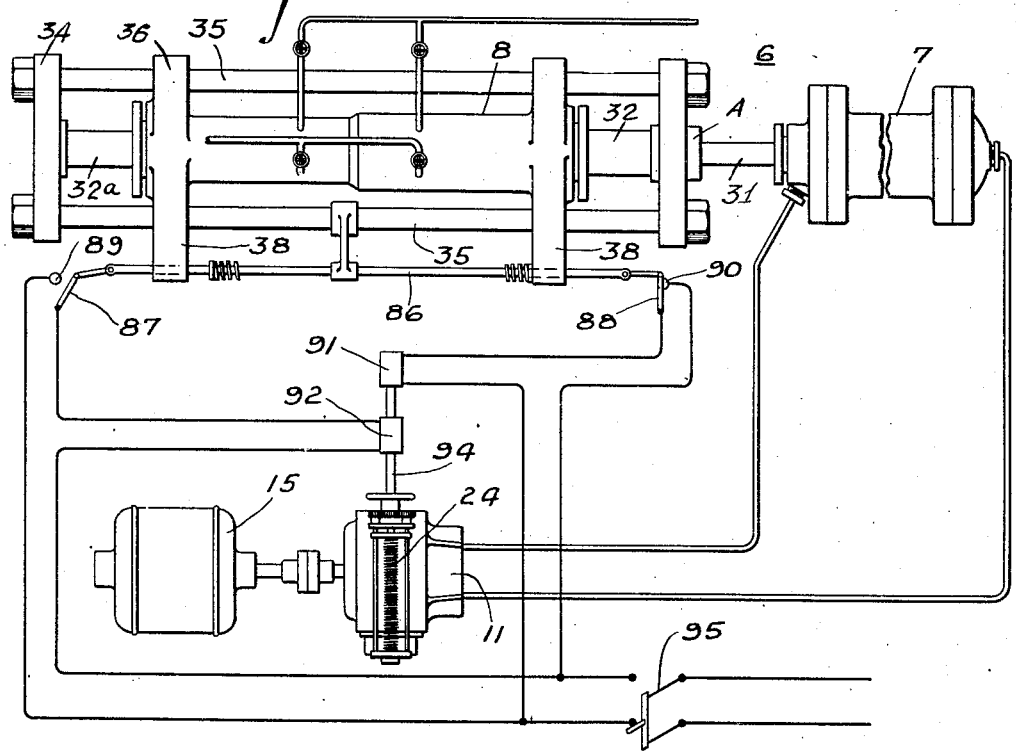
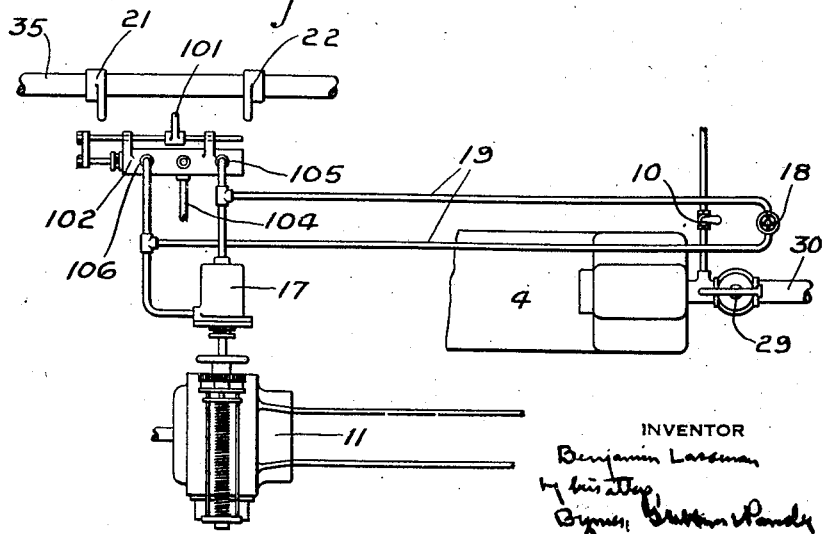
INVENTOR
Benjamin Lassman
by his attys Patented June 23, 1931

1,811,138

UNITED STATES PATENT OFFICE

BENJAMIN LASSMAN, OF PITTSBURGH, PENNSYLVANIA, ASSIGNOR TO THE AMERICAN FLUID MOTORS COMPANY, OF PHILADELPHIA, PENNSYLVANIA, A CORPORATION OF PENNSYLVANIA

APPARATUS FOR PRESSURE TESTING

Application filed October 3, 1927. Serial No. 223,590.

My invention relates to pressure testing apparatus. In testing hollow bodies such as pipes, boilers, and the like, it is general practice to first drive out the air in the body by a fluid under a pressure slightly above atmospheric pressure. Thereafter an intermediate pressure is applied to the body for a definite time. This is followed by the application of a high testing pressure to the body. For testing pipes, a convenient range of pressure is from twenty to fifty pounds per square inch for the first pressure, five hundred to seven hundred fifty pounds per square inch for the second pressure, and fifteen hundred to twenty-five hundred pounds per square inch for the third pressure. The exact pressure between any of these limits is of course dependent upon the size and weight of the pipe under test.

The first pressure is often obtained by the use of centrifugal pumps and a stand pipe filled with a fluid, such as water. The second pressure is often obtained by the use of reciprocating pumps and an accumulator. The third pressure is obtained by the use of a multiple system of intensifiers with a series of change-over valves or a variable weighted accumulator. Weights are added to or removed from the accumulator according to the pressure desired and the pumps are designed to carry the highest test pressure. With such a variable loaded accumulator system, much time is lost and considerable inconvenience arises from changing the weights when it is desired to vary the test pressure applied to the body under test. Difficulty is also encountered by reason of water hammers, leakage, packing, and the general control of such an accumulator.

In my apparatus a single operator, by the manipulation of a hand wheel and a small number of conveniently located valves, is able to secure an infinite number of pressures between the operating limits of the testing apparatus. This is accomplished by utilizing a pump having the characteristics of reversibility and adjustability for delivering any predetermined constant pressure within its operating range. The discharge from the pump is smooth and non-pulsating. The pump automatically ceases to deliver fluid when the demand upon it becomes zero. Such a pump is shown and described in the patents to Hele-Shaw Nos. 1,077,980, November 11, 1913, and 1,152,729, September 7, 1915, although it is to be understood that other types of pumps may be substituted for the Hele-Shaw pump without departing from the spirit of the present invention.

The pump may be controlled by a number of means for automatically determining the direction of its discharge in accordance with the position of a double acting pump connected directly to the test bench, and actuated by the first pump. The pressure delivered to the double acting pump varies in accordance with the setting of the first or power pump. The power pump delivers a fluid under pressure, preferably oil, into a double acting cylinder located at one end of the double acting pump. The other end of the last mentioned pump is provided with a piston for compressing a cheaper fluid, such as water, and supplying it through suitable control valves to the body under test. The pressure piston is preferably double acting.

A reversible pilot pump, an electromagnet or a four way valve may be utilized for controlling the direction of discharge of the power pump as desired. In any case the operator is able to control the direction of discharge by the manipulation of a suitable valve or lever, and the direction of discharge is also controlled in accordance with the movement of the pressure pump. The pressure of the fluid discharged by the power pump and, consequently the pressure developed in the double acting pump is controlled by the setting of a tensioning device on the power pump. This construction eliminates the large accumulators and variable weights and intensifiers heretofore utilized, together with the complicated piping systems incidental thereto. The weight and space requirements of the system are also materially reduced by utilizing my device.

Since the power input to the driving motor varies directly with the load upon the motor, the motor idles when a test is not actually being conducted, which results in a material increase in the efficiency of such testing systems over that of a reciprocating pump which operates against substantially a constant pressure regardless of the demands made upon it. At the same time a greater flexibility of operation is obtained by the concentration of the control of the apparatus in a hand-wheel and a small number of valves. The accompanying drawings illustrate several modifications of the invention, in which:

Figure 1 is a diagrammatic plan view of apparatus embodying my invention.

Figure 2 is a view, partially in elevation and partially in section, of the power pump and pressure controlling apparatus.

Figure 3 is a plan view of the pressure controlling device.

Figure 4 is a sectional view of a detail.

Figure 5 is a diagrammatic view of circuits and apparatus embodying a modification of the invention.

Figure 6 is a diagrammatic view of a modified form of controlling apparatus utilizing a pneumatic system, and, Figure 7 is a view partially in elevation and partially in section of mechanism for interconnecting valves.

Referring to Figure 1, the pressure testing apparatus comprises a testing bench 4 having a supporting stock 5 mounted thereon; a double acting, pressure interchanging pump 6 comprising a double acting cylinder 7 for actuating a piston in a double acting cylinder 8 supplying fluid under high pressure through a pipe line 9 and a valve 10 to the stock 5; and a reversible discharge power pump 11 connected by pipe lines 12 and 14 to the ends of the cylinder 7 for actuating the pressure interchanging pump 6. Pump 11 is actuated by a motor 15 that also drives a reversible pilot pump 16 connected to a double acting cylinder 17 and a valve 18 in parallel relation to the discharge orifices, by a pipe line 19. The direction of discharge of the fluid from the pilot pump 16 is controlled by a toggle mechanism 20, actuated by lugs 21 and 22 carried on the pressure interchanging pump 6. The double acting cylinder 17 controls the direction of discharge of the power pump 11 by actuating a controlling mechanism 24, shown in detail in Figures 2 and 3.

The testing bench 4 may be of any particular design in accordance with the type of material being tested, since the invention is applicable to any type of testing device utilizing fluid under pressure for testing hollow bodies such as tanks, boilers, pipes, and the like. Stock 5 is provided with a nozzle 25 projecting into the interior of the material supported thereby. The nozzle 25 is connected by a passageway 26 to a pipe T 27, to one opening of which the valve 10 is connected by pipe connection 28. The other opening of the T 27 is attached to a low pressure valve 29 communicating through a pipe 30 with a source, not shown, of a low pressure fluid. By manipulating the valve 29 and the nozzle 25, while the valve 10 is closed, a hollow body mounted on the bench 4 has the air driven therefrom and is filled with fluid under low pressure.

For testing pipes, the initial air is driven out by a fluid, such as water, under pressure of from twenty to fifty pounds per square inch. After the air is driven out valve 29 is closed, valve 10 is opened, and valve 18 is closed, causing pump 16 to place pump 11 on stroke to deliver fluid to cylinder 7, which causes cylinder 8 to draw fluid and deliver it through pipe 9 and valve 10 to the test bench 4. The fluid in the cylinder 8 is preferably water, although the apparatus is adapted for use with other liquids and with gases if desired. The valves 10 and 29 may be mechanically connected to preclude the possibility of both being opened simultaneously as shown in Figure 7.

The cylinder 7 of the pressure interchanging pump 6 is connected by a piston rod 31 to a piston 32 in the cylinder 8. The piston rod 31 terminates in a flange A which is bolted to a cross-head 38, which, by means of the side rods 35, is also connected to a cross-head 34 and to a plunger 32a. The side rods 35 extend through lugs 36 and 37 on the cylinder 8. Accordingly, the cross-heads 34 and 38, together with the side rods 35, constitute a moving frame for supporting the lugs 21 and 22. An intake pipe 39 is provided for introducing fluid into the cylinder 8 at each side of the piston 32. Check valves 40 are provided for controlling the movement of fluid in the intake pipe 39 and the outlet pipe 9. Since the purpose of the cylinder 7 is to actuate the piston rod 31, and not to pump fluid, the pipe lines 12 and 14 and the power pump 11 are filled with oil, which because of its high lubricating qualities is better suited for high pressure applications.

Referring particularly to Figure 2, the power pump 11 is here illustrated as of the Hele-Shaw type shown in Patents No. 1,077,980 and No. 1,152,729, although it is to be understood that other types of reversible pumps operating with a smooth, non-pulsating movement, discharging at a predetermined pressure may be substituted therefor. The pump 11 comprises a frame 40a in which there is mounted a ring 41 connected to rods 43 and 44 that extend outwardly on opposite sides of the frame 40a. By shifting the position of the rods 43 and 44, the position of the ring 41 relative to the center of the frame 40a is shifted. A plurality of plungers 45 are pivotally mounted on the ring 41 so that, as the ring 41 is shifted, the plungers 45 are moved eccentrically of the frame 40a. The pump rotor 46 comprises a plurality of cylinders 47 into which the plungers 45 extend.

The cylinders 47 terminate in a central opening 48, from which orifices 49 and 50 extend to connect with the pipe lines 12 and 14.

For reasons fully described in the above-identified patents, the shifting of the ring 41 from side to side of the frame 40a, controls the direction of discharge of fluid from the pump, even while the rotor 46 continues to turn in a single direction. The length of the strokes of the plungers 45 is determined by the amount of eccentricity of the ring 41 and, accordingly, a variation in the position of the ring determines the pressure at the discharge orifice of the pump provided no substantial amount of fluid is lost in the pump, pipe lines 12 and 14, and the cylinder 7.

For maintaining a constant pressure in the pump 11, the rods 43 and 44 are provided with pistons 51 and 52 within their corresponding cylinders, respectively, that are connected by pipes 54 and 55, respectively, to the discharge orifices 49 and 50. Accordingly, as the pressure in the pump varies, the rods 43 and 44 and the ring 41 tend to be shifted from side to side by the fluid pressures against the pistons 51 and 52 to bring the pump to zero discharge in either direction.

A double arm lever 56 is fulcrumed about a pin 57 carried by an extension 58 of the frame 40a. The lower ends of the levers arms are secured by pins 59 to the rod 44. The upper ends of the lever arms 56 are pivotally secured to a cross-head 60 constituting a portion of the pressure control mechanism 24. Accordingly, movement of the cross-head 60 corresponds to movement of the rod 44. If the lower end of the rod 44 is moved to the right as viewed in Figure 2, the direction of discharge of fluid from the pump 11 may be assumed to be through the pipe 12, and if moved to the left, may be assumed to be reversed and directed through the pipe 14.

Referring particularly to Figures 2 and 3, the cross-head 60 carries a pair of rods 61, the outer ends of which are oppositely threaded, as at 62, and extend through openings 64 in a cross-head 65 with a sliding fit. The ends of the rods 61 are provided with gears 66 that mesh with a gear 67 mounted on a hand-wheel 68. Hand-wheel 68 has threaded engagement with a rod 69 extending through the cross-heads 60 and 65 with a sliding fit. A jam nut 70 is provided for securing the hand-wheel 68 against accidental rotation. The rod 69 is supported by a bushing 71 carried in a lug 72 projected from the motor frame 40a. The outer end of the rod is supported by the lever 56. A coil spring 73 is mounted on rod 69 and bears against a plate 74 that is separated from the cross-head 60. The plate 74 is provided with a pin 75 that is movable in a slot 76 in the rod 69.

With the foregoing construction, the manipulation of the hand-wheel 68 causes the gears 66 to move along rods 61 by reason of their engagement with the gear 67 secured to the hand-wheel 68. The position of the hand-wheel 68 on the rod 69 controls the tension of the spring 73 and, accordingly, the tension that must be overcome to move the rods 61 relatively to either cross-head 60 or 65. The position of the rod 69 is controlled by a piston 77 mounted in the cylinder 17. Movement of the piston 77 moves the rod 44 and the ring 41, thereby determining the direction of fluid discharged from the pump 11.

Further movement of the ring 41 in either direction is resisted by the spring 73. However, as the pressure in the pump 11 builds up, one or the other of the pistons 51 and 52 tends to move in opposition to the spring 73 for returning the ring 41 to the center of the frame 40a, thereby reducing the stroke of the several plungers 45 and incidentally sustain the pressure of the discharged fluid. If the fluid pressure becomes greater than the resistance of the spring 73, the ring 41 is moved to the right or left, as the case may be, by one of the plungers 51 or 52 by compressing the spring 73.

Assuming the parts to be in the position shown in Figure 2, and the pressure becomes sufficient to move the rod 44 to the left, the top of the lever arms 56 are moved to the right of Figure 3 and the gears 66 tend to separate from the gear 67, at which time the cross-head 60 bears against plate 74 and spring 73, which in turn bears against the cross-head 65 and the hand-wheel 68. Thrust on the hand-wheel is transmitted by the rod 69 to the piston 77. The piston 77 is held in place by a pilot pump 16, as hereinafter more fully described.

Assuming the axis of the lever arms 56 to be moved to the opposite side, from that shown in Figure 2, of a vertical plane intersecting the pins 57, then movement of the piston 51 causes the rods 61 to pull against cross-head 65 and compress spring 73, which in turn bears against plate 74 and pin 75 as the cross-head 60 slides along rod 69.

The pilot pump 16 is of the same general design as the power pump 11 except that it is smaller in size. For reversing the direction of flow of the pilot pump 16, the toggle mechanism 20 is provided. Toggle mechanism 20 comprises a bell crank 78 that has a loss motion connection with a lever 79. Lever 79 is pivoted at one end to a cylinder 80 shown in Figure 4. A cup shaped plunger 81 is pivoted adjacent to the open end of the cylinder 80 and encloses a spring 82 therein. Cylinder 80 is also pivotally connected to a rod 84, corresponding to rod 69 in pump 11, for controlling the direction of fluid discharged from the pump 16.

Upon engagement with the free end of the bell crank 78 by either of the lugs 21 or 22 during movement of the piston 32 the bell crank is rotated to turn the lever 79. During the first part of the movement of the lever 79, the spring 82 is compressed until it is in line with the fulcrums of the plunger 81 which is pivoted to the frame or bed plate and lever 79. Thereafter the spring expands with a snap motion to throw the lever 84 one way or the other.

When the valve 18 is opened, the pilot pump 16 is on full discharge, circulating oil at zero pressure within the pipe line 19. The power pump 11 is also on neutral and idles at zero pressure and zero discharge as the piston 77 of the cylinder 17 is in neutral position. When the valve 18 is closed, the pilot pump discharge immediately causes the pressure in the pipe line 19 to move the piston 77 in one direction or the other, which shifts the ring 41 in the pump 11 for controlling the direction of pressure applied to the cylinder 7. The piston rod 31 then moves to compress fluid in the cylinder 8 and pipe line 9 until one of the lugs 21 or 22 engages the bell crank 78. Upon engagement with the bell crank 78, the direction of discharge of the pilot pump 16 is reversed, which automatically reverses the direction of pressure discharged from the power pump 11, thereby restoring the piston rod 31 to its original position. This cycle of operation takes place automatically so long as the valve 18 is closed. By opening the valve 18, the pressure in the cylinder 17 is released and the power pump 11 returns to neutral position by reason of the pressure imposed upon one of the pistons 51 or 52 operating through the lever 56 and pressure control mechanism 24 to shift the piston 77 to neutral position.

Thereafter the power pump 11 idles on substantial zero pressure. This feature differs from the use of reciprocating pumps where the pumps must be kept in operation against substantially a definite pressure during periods of idling for the testing equipment.

Accordingly, during a testing operation, the cylinder 7 exerts substantially a constant pressure upon the fluid in the cylinder 8, thereby eliminating pulsations in the pressure applied to the body under test on the testing bench 4. Only when the pressure interchanging pump 6 reaches the end of its stroke, is there a break in the pressure applied. This break however, is of short duration as the power pump 11 soon builds up the desired pressure and maintains it during the balance of the stroke of the piston 32.

Referring to Figure 5, in a modification of the invention, one of the rods 35 on the pressure interchanging pump 6 actuates a rod 86 provided with moving switch blades 87 and 88 at each end thereof. The switch blades 87 and 88 cooperate with stationary contact members 89 and 90, respectively, for closing circuits to solenoids 91 and 92 connected by a rod 94 to the pressure control mechanism 24 on the power pump 11. The rod 94 corresponds to the rod 69 shown in Figure 2. At the end of each stroke of piston 32, one of the switches 87 or 88 is opened and the other closed, which energizes or de-energizes the cooperating solenoids 91 or 92. The energization of either solenoid 91 or 92 moves the pressure control mechanism 24 into a desired position for controlling the pressure discharge from the pump 11. In this form of my invention the pipe line 19 and valve 18 shown in Figure 1 are eliminated. A pilot switch 95 is provided for controlling the energization of the switches 87 and 88. When the pilot switch 95 is opened, the electrical control system is inoperative. By having the pilot switch 95 within the reach of the operator he is able to start and stop the reciprocation of the pressure interchanging pump 6.

Referring to Figure 6, in another modification of the invention, the lugs 21 and 22 engage a lug 101 that controls a four way valve 102. Valve 102 is connected by a pipe 104 to any suitable source of compressed fluid. Ports 105 and 106 in the valve 102 are connected to the cylinder 17 for controlling the power pump 11. In this form of the invention the pipe line 19 and valve 18 are connected to the ports 105 and 106 in parallel relation to the cylinder 17. Upon movement of the lug 101 ports 105 and 106 are alternatively uncovered to permit fluid under pressure from the pipe 104 to travel through the valve 102 to one of the terminals of the cylinder 17, provided the valve 18 is closed. Manipulation of valve 18 controls the power pump through the cylinder 17 in the manner described in connection with the modification shown in Figure 1.

It is to be understood that various changes may be made in the invention without departing from the spirit thereof or the scope of the appended claims.

I claim:

1. The combination with a material supporting device and reversible fluid-actuated means for supplying fluid under pressure thereto, of a control device for the fluid-actuated means comprising a variable and reversible delivery pump for delivering fluid under predetermined pressure to the supply means.

2. An apparatus for subjecting containers to high pressures, comprising a pump for supplying fluid under pressure to a container under test, and a second pump for operating the first pump, said second pump being of a variable and reversible output, and substantially constant pressure type.

3. In combination, a fluid-actuated device, a pump provided with means for reversing the direction of discharge fluid for supplying fluid thereto at a predetermined pressure, and means controlled in accordance with the operation of the fluid actuated device for reversing the direction of the fluid discharged from the pump.

4. In combination, a fluid-actuated device, a pump provided with means for reversing the direction of discharged fluid for supplying fluid thereto at a predetermined pressure, and means controlled in accordance with the operation of the fluid actuated device for reversing a characteristic of the fluid discharged from the pump.

5. In combination, a container, a fluid actuated pump for supplying fluid under compression to the container, and a second pump for controlling the actuation of the first named pump by varying the direction of the pressure of the fluid supplied thereto.

6. In combination, a container, a fluid actuated pump for supplying fluid under compression to the container, and a second pump for controlling the actuation of the first named pump by varying the volume and direction of the fluid supplied thereto.

7. In combination, a fluid actuated pump for supplying fluid under compression to a container, and a second pump for controlling the actuation of the first named pump by varying the volume and direction of the fluid supplied thereto while maintaining substantially a constant pressure within the container.

8. In combination, a fluid actuated pump for supplying fluid under compression to a container, a second pump for controlling the actuation of the first named pump by varying the direction of the pressure of the fluid supplied thereto, and a control system for the second pump.

9. In combination, a fluid actuated pump for supplying fluid under compression to a container, a second pump for controlling the actuation of the first named pump by varying the volume and direction of the fluid supplied thereto, and a control system for the second pump.

10. In combination, a fluid actuated pump for supplying fluid under compression to a container, a second pump for controlling the actuation of the first named pump by varying the volume and direction of the fluid supplied thereto while maintaining substantially a constant pressure within the container, and a control system for the second pump.

11. In a rotary pump structure, a plurality of radially disposed reciprocating pump elements, means for shifting the pump elements relative to their center for varying their strokes, and means responsive to the pressure within the pump for modifying the action of the shifting means.

12. In a rotary pump structure, a plurality of radially disposed pump elements, means for shifting their positions relative to a common center for varying their strokes, and adjustable means for controlling the operation of the shifting means to control a characteristic of the pump output.

13. In a rotary pump structure, a plurality of radially disposed pump elements, means for shifting their positions relative to a common center for varying their strokes, adjustable means for controlling the operation of the shifting means to control a characteristic of the pump output, and means responsive to the pressure of fluid delivered by the pump for modifying the operation of the shifting means.

14. The combination with a fluid actuated pump, of a second pump for supplying fluid to the first pump, the second pump comprising a movable member for varying the direction, volume and pressure of fluid discharged therefrom, and means for controlling the position of the movable member in accordance with the operation of the first named pump.

15. The combination with a fluid actuated pump comprising a double acting cylinder, of a second pump having a plurality of orifices and means for controlling the direction, volume and pressure of fluid traversing the orifices comprising a movable member, a non-expansible connecting means between the opposite ends of the cylinder and certain of the orifices for transmitting fluid pressure to the cylinder in opposite directions, and means responsive to the operation of the fluid actuated pump for controlling the position of the movable member.

16. In combination, a test bench, means for supplying fluid under pressure to the test bench, and means for actuating the supply means comprising a variable and reversible pump for delivering fluid under pressure to the supply means.

17. In combination, a test bench, means for applying fluid under pressure to the test bench and means for actuating the supply means comprising a variable and reversible discharge pump for delivering a non-pulsating stream of fluid to the supply means.

18. In combination, a test bench, means for applying fluid under pressure to the test bench, means for actuating the supply means comprising a variable and reversible discharge pump for delivering a non-pulsating stream of fluid to the supply means, and means for automatically reversing the direction of fluid discharge of the pump without reversing the direction of the fluid pressure applied to the test bench.

19. The combination with a reversible and variable output pump, of means for controlling the direction and pressure of the output from the pump comprising a resilient member, means for bodily moving the resilient member, and means for placing the resilient member under tension.

20. The combination with a reversible and variable output pump, of means for controlling the pump comprising a resilient member, means for bodily moving the resilient member for controlling the direction of discharge from the pump, and means for controlling the tension of the resilient member for controlling the discharge pressure of the pump.

21. The combination with a pressure testing bench, of means for supplying fluid under pressure thereto comprising a continuously operating pump having a reversible and variable discharge, and means for controlling the direction and pressure of the discharge during periods of testing and permitting the pump to operate at substantially zero pressure during periods of idleness.

22. The combination with a pressure testing bench, of means which delivers fluid to the testing bench, a variable and reversible pump for controlling the delivery of fluid under predetermined pressure to said means, and means for controlling the direction of flow and the pressure of fluid discharged from the pump.

23. The combination with a pressure testing bench, of means which delivers fluid to the testing bench, a variable and reversible pump for controlling the delivery of fluid under predetermined pressure to said means, and means for automatically controlling the direction of flow and the pressure of fluid discharged from the pump.

24. The combination with a pressure testing bench, of means for supplying fluid under pressure thereto comprising a continuously driven pump having a reversible and variable discharge, and means for controlling the direction of discharge and the pressure of fluid discharged from the pump during periods of testing, said controlling means permitting the pump to operate at substantially zero pressure and zero discharge when desired.

25. The combination with a pressure testing bench, of means for supplying fluid under pressure thereto comprising a continuously driven pump having a reversible and variable discharge, and fluid actuated means for controlling the direction of discharge and the pressure of fluid discharged from the pump during periods of testing, said controlling means permitting the pump to operate at substantially zero pressure and zero discharge when desired.

26. The combination with a pressure testing bench and means for supplying fluid under sustained pressure thereto, of pressure responsive means for continuously controlling the operation of the supply means.

27. In a fluid system of the class described in which fluid at a predetermined pressure is supplied to and maintained in a closed vessel, means for supplying fluid under pressure to the vessel comprising a double acting ram and a variable volume constant pressure fluid system connected with the ram for operating the same.

28. In a fluid system of the class described in which fluid at a predetermined pressure is supplied to and maintained in a closed vessel, means for supplying fluid under pressure to the vessel comprising a double acting ram and a variable capacity constant pressure fluid system connected with the ram for operating the same, and selectively operable means for changing the effective pressure of said variable capacity system.

29. In a fluid system of the class described for supplying fluid at a predetermined constant sustained pressure to a vessel to be subjected to pressure, a primary system adapted to be connected to the vessel comprising a driven pump ram having a cylinder and an actuating ram having a cylinder, said rams and cyliners being connected, and a secondary system comprising a constant pressure fluid supply unit of variable output having its output operably connected to said primary system.

30. In a fluid system of the class described for supplying fluid at a predetermined constant sustained pressure to a vessel to be subjected to pressure, a primary system adapted to be connected to the vessel comprising a driven pump ram having a cylinder and an actuating ram having a cylinder, said rams and cylinders being connected, and a secondary system comprising a constant pressure fluid supply unit of variable output having its output operably connected to said primary system and adjustable means for changing the pressure applied to the actuating cylinder of the primary system.

31. In a pressure supply system for supplying fluid under pressure to a closed vessel and maintaining a definite pressure in the vessel for a sustained period of time, a closed fluid circulating system including a variable volume pump for circulating fluid through the closed system, a pressure applying system to be connected to the vessel to be subjected to pressure, and a pump in the second system driven by the circulation of fluid through the first system.

32. In a pressure supply system for supplying fluid under pressure to a closed vessel in order to develop a definite pressure in the vessel, a closed variable volume fluid circulating system including a variable volume pump and a pressure applying system to be connected to the vessel to be subjected to pressure, and a pump in the second system driven by the circulating of fluid through the first system, the second system first filling the closed vessel and then developing pressure through the operation of the first system.

33. In a pressure supply system for supplying fluid under pressure to a closed vessel in order to develop a definite pressure in the vessel, a closed variable volume fluid circulating system including a variable volume pump and a pressure applying system to be connected to the vessel to be subjected to pressure and a pump in the second system driven by the circulation of fluid through the first system, the second system first filling the closed vessel and then developing and sustaining pressure through the operation of the first system.

In testimony whereof I have hereunto set my hand.

BENJAMIN LASSMAN.